United States Patent [19]

Yvorra

[11] 4,451,999

[45] Jun. 5, 1984

[54] ANIMAL IDENTIFICATION DEVICE

[76] Inventor: Georges Yvorra, 9, rue du Baigneur, Paris, France, 75018

[21] Appl. No.: 288,732

[22] Filed: Jul. 31, 1981

Related U.S. Application Data

[63] Continuation of Ser. No. 926,394, Jul. 20, 1978, abandoned.

[30] Foreign Application Priority Data

Feb. 27, 1978 [FR] France .................................. 78 05481

[51] Int. Cl.³ .............................................. G09F 3/00
[52] U.S. Cl. ...................................... 40/301; 128/330
[58] Field of Search .................. 40/300, 301; 128/330; 227/144, 143, 140

[56] References Cited

U.S. PATENT DOCUMENTS 3,731,414 5/1973 Murphy et al. ...................... 40/301

OTHER PUBLICATIONS

Murphy et al., New Zealand Application No. 162,709, Found in Patented File of U.S. Pat. No. 3,731,414.

Primary Examiner—Michael H. Thaler
Attorney, Agent, or Firm—Larson & Taylor

[57] ABSTRACT

An improved identification device for animals comprising: a first plate being connected to a sleeve having a passage therein, the first plate having a cap with an insertion opening which opens into the passage, the insertion opening having a diameter smaller than the size of the passage, the cap being connected to the sleeve by means of a shoulder; and a second plate having a tubular post attached thereto, the post having one section larger than the insertion opening and a detachable conical member located at the end of the post spaced from the second plate, the conical member having a base and ending in a point, the base having a diameter at least equal to that of the section of the post which is larger than the insertion opening.

A tool for positioning the identification device onto an animal which comprises first and second jaws, the first jaw comprising a rod directed towards the second jaw, the rod being adapted to receive the sleeve, the second jaw comprising a seating adapted to receive the sleeve, the seating having a hole at one end thereof, adapted to align with the passage when the sleeve is inserted in the second jaw, the hole having a diameter smaller than the base of the conical member. The hole is arranged such that the rod can force the conical member through the hole to detach it from the tubular post.

A method of attaching the device is further disclosed.

2 Claims, 5 Drawing Figures

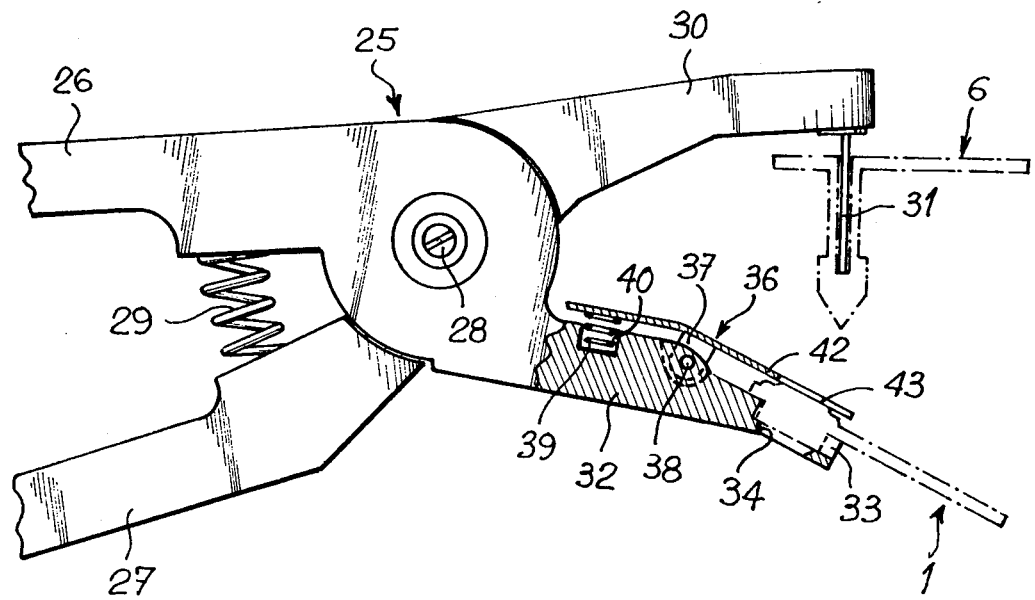
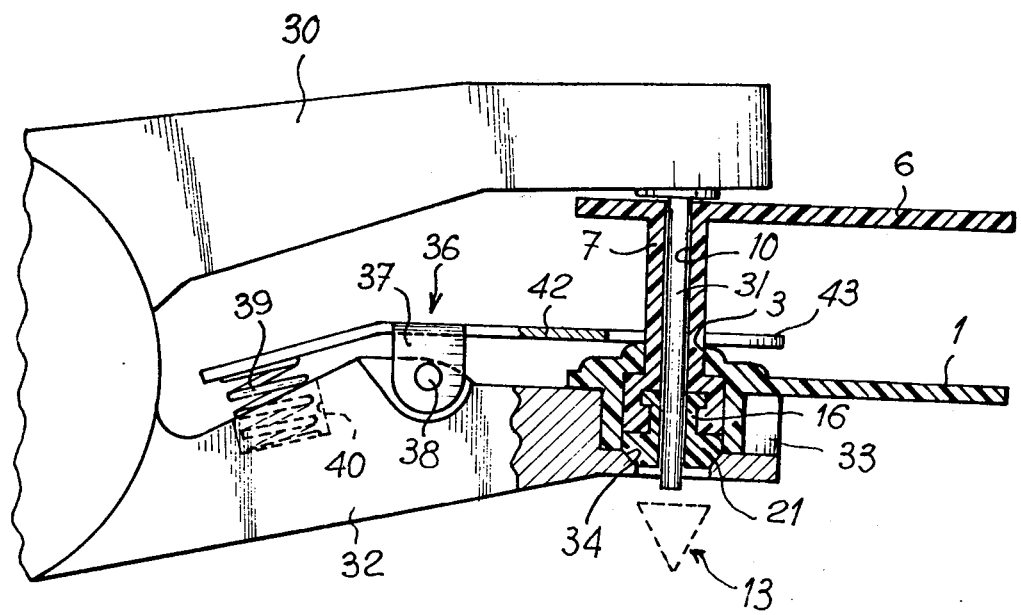

ANIMAL IDENTIFICATION DEVICE

This a continuation of the application Ser. No. 926,394 filed July 20, 1978 now abandoned.

BACKGROUND OF THE INVENTION

1. Field of the Invention

The present invention relates to a device for the identification of animals, such as cows, to a tool for placing the said device in position, and a method of attaching the device to animals.

2. Description of the Prior Art

Tagging or identification devices generally comprise a first plate of flexible and elastic material attached to a sleeve, the entire plate being of unitary construction. The devices also comprise a second plate having a post which extends from one face of the second plate. The free end of the post is pointed and the post comprises a shoulder between its two ends.

Such devices are attached with a special pincer device, of which one jaw comprises a support for fixing the sleeve, while the other jaw is provided with a rod designed to be engaged axially in the post, which is hollow. The identification device is attached by arranging a load pincer device such that the section of the skin-covered cartilage portion of the ear of the animal to be identified is inserted between the jaws of the pincer device. The arms of the pincer are operated so that the point of the post passes through the cartilage and the sleeve, causing an elastic deformation of the latter, such that the post remains held by its shoulder against a corresponding shoulder of the sleeve. By subsequently spacing the jaws at least one of the elements of the identification device is released.

Animals seek to free themselves of such identification devices by rubbing themselves against trees, iron wires, fences and the like. It is, therefore, essential that the assembled identification device be extremely flexible and elastic so as to avoid this tearing action. Nevertheless, since the cartilage offers a certain resistance to insertion of the identification devices, the point of the identification device has to be sufficiently hard so as to be able to pass through it.

Generally, the post and the corresponding plateconsist of a single piece of molded material and the free end of the post comprises a truncated cone. The small or minor base of the cone faces the free end, while the larger base of the truncated cone forms a shoulder. The small base ends in a point of hard material, the said point being formed of a cone, of which the large base is of unitary construction with a small barrel ending in a collar or flange. The barrel is inserted into the axial passage of the post and the flange is arranged in a groove provided in the axial passage.

Such an arrangement has the disadvantage that, when placing the identification device in position, the conical point is detached from the post prior to completing insertion of the identification device. This inconvenience is due to the fact that the free end of the rod of the pincer device abuts against the flange of the conical point and thus tends to drive the latter, whereas the lateral surface of the frustoconical end of the post, by butting against the rim of the sleeve, tends, on the contrary, to be separated from the said conical point.

It is obvious that, in very many cases, it is not possible to position the device on the ear of the animal.

Another problem encountered with conventional identification devices is that they are normally to be used to identify only one animal and must not be capable of being detached from that animal's ear to be placed on another animal. Known devices have the disadvantage that it is possible to detach the plates from one another, so that such a device may be used several times, thus obviating the purposes of the device.

SUMMARY OF THE INVENTION

It is, therefore, an object of the invention to provide an identification device which may be inserted in the ears or other parts of animals without the pointed tip of the device separating prematurely.

It is a further object of the invention to provide a method and tool for attaching the improved device onto animals.

It is yet another object of the invention to provide an identification device which may not be removed from one animal and attached to another.

Yet a further object of the invention is to provide a tool and method for attaching such a device.

These and other objects of the invention are achieved by the identification device of the invention which comprises a first plate. The first plate is connected to a sleeve having a passaage therein and has a cap with an insertion opening which opens into the passage. The insertion opening has a diameter smaller than the size of the passage and the cap is connected to the sleeve by means of a shoulder. The device further comprises a second plate connected to a tubular post. The post has one section larger than the insertion opening. A detachable conical member is located at the end of the post spaced from the seond plate. The conical member has a base and ends in a point. The base has a diameter at least equal to that of the section of the post which is larger that the insertion opening.

The invention further comprises a pincer tool for positioning an identification device onto an animal. The identification device comprises first and second plates. The first plate has a passage therein and an insertion opening leading into the passage. The passage is enclosed within a sleeve. The second plate is provided with a tubular post attached to the plate and the tubular post comprises one section larger than the insertion opening. The larger section of the post is connected to a detachable conical member. The tool itself comprises first and second jaws. The first jaw comprises a rod directed towards the second jaw and is adapted to engage the tubular post of the second plate. The second jaw comprises a seating adapted to receive the sleeve, as well as a retaining bar adapted to cooperate with the sleeve adjacent to the insertion opening. The seating has a hole at one end thereof adapted to align with the passage where the sleeve is inserted in the second jaw. The hole has a diameter smaller than the base of the conical member and is arranged such that when the first plate is inserted within the second jaw, and the jaws are closed, the rod forces the conical member through the hole and detaches it from the tubular post.

The invention further comprises a method of attaching an identification device onto the skin of an animal. The identification device being of the type comprising a first plate. The first plate is connected to a sleeve having a passage therein. The first plate also has a cap with an insertion opening which opens into the passage and has a diameter smaller than the size of the passage. The cap is connected to the sleeve by means of a shoulder. The device further comprises a second plate having a tubular post attached thereto which has one section larger than the insertion opening and a detachable conical member located at the end thereof spaced from the second plate. The conical member has a base and ends in a point. The base has a diameter at least equal to that of the section of the post which is larger than the insertion opening. The method itself comprises the steps of: positioning the first and second plates on opposite sides of the skin of the animal; inserting a rod within the tubular post so as to force the post through the skin of the animal and into the insertion opening such that detachable conical member passes through the insertion opening and then into the passage; and detaching at least a portion of the conical member from the tubular post by forcing the rod against the base of the conical member.

BRIEF DESCRIPTION OF THE DRAWINGS

FIG. 4 is an elevational view, partially cut away, showing a pincer tool according to the invention; and FIG. 5 is a sectional view, on a magnified scale showing the assembly of the two elements.

DESCRIPTION OF PREFERRED EMBODIMENTS

Figure 1:
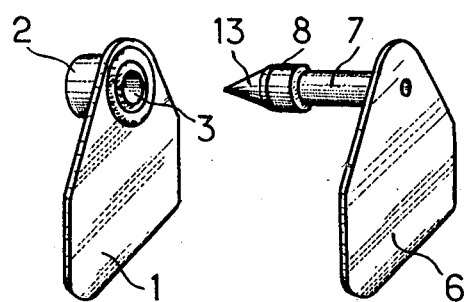
FIG. 1 is an exploded perspective view of an identification device according to the invention.
Figure 2:
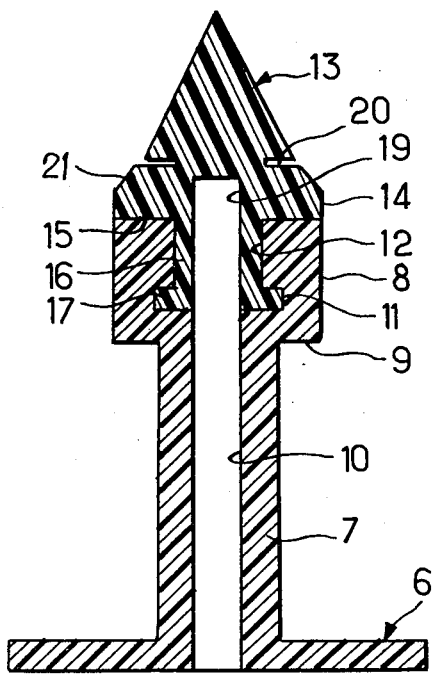
FIG. 2 is a magnified sectional view of the second plate comprising a post terminating in a conical point.
Figure 3:
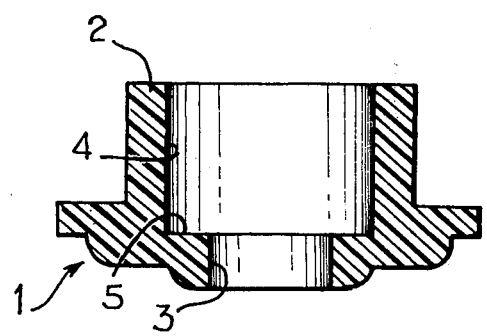
FIG. 3 is a magnified sectional view of the first plate.

The device of the present invention is of the type comprising a first plate of flexible and elastic material provided with a sleeve having a passage with an insertion opening having a diameter smaller than that of the passage. These two parts are connected by a shoulder. The device further comprises a second plate of flexible and elastic material, of which one of the faces is connected, and of unitary construction with, a tubular post comprising, near its free end, an enlarged portion of a cross-section corresponding to that of the passage in the sleeve and connected to the post by a shoulder. The free end ends in a detachable hard conical member topped by a point, and is characterized in that the large base of the conical point has a diameter at least equal to that part of the post whose section is larger than the insertion opening of the sleeve.

Because of this arrangement, when placing the identification device in position, the point of the conical member, after having passed through the cartilage, directly cooperates with the insertion opening of the sleeve, so that there will be no danger of it becoming improperly detached from the post of the second plate.

In one embodiment of the invention, the part of the post whose section is larger than the insertion opening of the sleeve is cylindrical and the conical member comprises a cylindrical section having the same diameter.

The tool used to insert the device of the invention is of the type formed by a pincer having two jaws, of which the first comprises a rod directed towards the other jaw and designed to be engaged in the tubular post of the second plate. The second jaw comprises a seating designed to receive the sleeve of the first plate and a retaining bar which is resiliently mounted and adapted to cooperate with the end of the sleeve adjacent the insertion opening. The bottom of the seating comprises a hole which is formed in such a manner as to be aligned with the passage of the sleeve. The hole has diameter smaller than the diameter of the base of the conical member, and the rod is arranged and of such a length that is passes through the hole upon the completion of the approach travel of the jaws.

Because of this arrangement, at the end of its travel, the rod destroys the point of the conical member, so that even if it were possible to separate the plates from one another, it would no longer be possible to perforate the cartilage of the ear nor to reintroduce the tubular post into the passage of the sleeve.

In order to facilitate the breaking off of the point of the conical member, the member comprises a weakened point of rupture.

The rupture is preferably formed by a groove provided at a plane somewhere between the base and the point of the conical member.

Finally, according to a second feature, the conical member comprises a passage coaxial with that of the post and has a base which extends adjacent to the groove. The diameter of the base of the cone is substantially equal to that of the passage. As a result, on reaching the end of movement for tightening the pincer device, the rod of the latter extends into the passage, bearing against the end thereof, and detaches the end of the conical member along the region defined by the groove.

The device shown in the figures is formed of a first plate 1 and a sleeve 2, unitarily constructed, topped by a cap comprising an insertion opening 3 and an internal passage 4. The diameter of the passage is larger than the insertion opening and the passages is connected to the insertion opening by means of a shoulder 5.

Reference numeral 6 indicates a second plate of the device, this latter comprising a tubular post 7, which ends in a section 8 which is cylindrical, having a diameter greater than the diameter of the insertion opening, as well as a diameter larger than the external diameter of the post. The post and the member are connected by means of a shoulder 9.

The tubular post 7 comprises an axial passage 10, having a groove close to the free end thereof and a part 12 of a diameter larger than that of the said passage 10.

Attached to the post 7 is a conical member 13 ending in a point and made of a hard material which is suitable for piercing the cartilage of the ear of an animal, such as a cow. The conical member 13 extends at its base into a cylindrical section 14 having a diameter which is the same diameter as section 8. The base 15 of the cylindrical section leads into rod 16 and is of one piece therewith and ends in a collar or flange 17.

The attachment of the conical member 13 to the free end of the post 7 is effected by fitting the member 16 with flange 17 into section 12 which comprises the groove 11.

Rod 16 comprises a hole 19, having a closed end, running axially through the rod. The diameter of the hole is the same as the passage 10 and extends coaxially therewith. The conical member 13 comprises a groove 20 which represents a weakened rupture point. A frustoconical portion 21 is located in the conical member 13 and is arranged between the rupture point and the cylindrical section.

A tool for fixing the device according to the invention, partially cut away, is shown in FIG. 4. This tool is formed by a pincer device, represented generally by the reference 25 and comprises two arms 26 and 27 which are hinged on a pivot 28, with a compression spring 29 interposed between the two arms and tending to space them apart. The arm 27 leads into a jaw 30 which comprises, close to its end, a rod 31 extending in the direction of a jaw 32 which is the extension of arm 26.

The jaw 32 comprises a seating 33, open at its free end, whose width corresponds to the outside diameter of the sleeve 2. The base of the seating 33 comprises a frustoconical hole 34 corresponding to the frustoconical portion 21 of the conical member 13. The frustoconical hole is formed so as to be aligned with the passage 4 when the sleeve 2 is placed in position in the seating 33.

The jaw 32 comprises a retaining bar 36 for the plate 1, which has two lugs 37 hinged on a pivot 38 of the jaw 32. The retaining bar is spring biased by means of a compression spring 39 inserted into a cavity 40 which biases operative end 42 against the part of the jaw 32 provided with the seating 33.

The operative end 42 has a slot 43 having a width corresponding to the outside diameter of the cylindrical section 8, which is a section larger than the insertion opening, of the tubular post 7.

Use of the tool is depicted in FIG. 5.

The plate 1 is placed in position on the jaw 32 so that end of the sleeve 2 bears against the bottom of seating 33, while the part adjacent to the insertion opening 3 cooperates with the retaining bar 36. In this way, the plate 1 is fixed on the jaw 32.

The rod 31 is of such a length and is so arranged that, in the position where the jaws are closest to one another, it extends substantially into the frustoconical hole 34. The tubular post 7 is engaged on the rod 31.

To attach the identification device, the arms 26 and 27 are brought towards one another against the action of the spring 29, with the ear of the animal to be identified being inserted between the jaws 30 and 32. As a result, the point on top of the conical member goes through the cartilage of the ear. The point then engages the insertion opening 3, causing an elastic deformation of the sleeve 2. When the shoulder 9 is within the passage and bears against the shoulder 5, the frustoconical part 20 of the conical member 13 bears against the frustoconical hole 34, so that the tubular post 7 can no longer be displaced. By further squeezing the arms 26 and 27, jaws 30 and 32 are brought closer together thus causing the free end of the rod 31 to bear against the conical member 13. Since the member has a weakened rupture point 20, the portion of the conical member above the rupture point is detached from the rest of the device.

Pressure on the arms 26 and 27 is then relaxed and these return to their initial position, so that the rod 31 is disengaged from the tubular post 7. By applying pressure to the member 36 in the region of the spring 40, the identification device may be removed from the seating 33 and slid out of slot 43 of the tool.

Since the identification device is now without a point, even if the two elements were to be separated, which would be difficult, the device could no longer be placed on the ear of another animal since it would not be possible either to perforate the cartilage or to engage larger section 8 into passage 4.

Although the specification has made reference to the sizes of the various openings and elements in terms of their diameters, this should not be construed as limiting the invention to strictly cylindrical members and openings. Alternative cross-sections may obviously be used within the context of the present invention.

The invention has been described with respect to particular embodiments of the identification device, the tool for attaching the device, and the method of attaching the device. It is to be understood, however, that the invention is not limited to these embodiments and that substitute equivalent materials may be used. The invention is to be construed, therefore, as being limited only by the claims.

What is claimed is:

1. A non-reusable improved identification device for animals which comprises:

a first part comprising
  a first plate made of flexible and elastic material and a sleeve connected to said first plate and extending therefrom, said sleeve having a passage therein, said first plate having an insertion opening communicating with said passage and having a diameter smaller than the cross-section of said passage to thereby define a first shoulder in the area of communication thus formed;

a second part comprising
  (a) a second plate made of flexible and elastic material, integral with a cylindrical tubular post, said cylindrical post comprising adjacent to its outer end an enlarged portion having a cross-section corresponding to that of the passage of the abovesaid sleeve, said enlarged portion being connected to said post by a second shoulder suitable for interlocking engagement with said first shoulder within said passage, said cylindrical post and enlarged portion further comprising an axial post passage extending therethrough;
  (b) a member of hard material comprising:
    a non removable base portion attached to the enlarged portion of said tubular post whose cross section does not exceed that of said enlarged portion,
    a conical portion comprising a pointed end extending from said base portion,
    a weakened rupture zone within said conical portion in a plane intermediate the end point of said conical portion and said base portion, thereby providing a frustconical portion between said rupture zone and said base portion, said weakened rupture zone comprising an unfilled groove on the surface of said conical portion,
    and a passage recess within said base portion, in line with the axial passage in said cylindrical post and enlarged portion, and ending within said frustoconical portion at an end adjacent to said rupture zone whereby, when said first part and second part are in interlocking engagement, insertion of a rod within said post passage and passage recess and pressure of said rod against the end of said passage recess, while the outer surface of said frustoconical portion is in abutment against another surface, results in the rupture of said weakened zone and the detachment of the part of said conical portion, including said pointed end, beyond said rupture zone, from the base portion attached to the enlarged portion of said tubular post.

2. The identification device of claim 1 wherein the base portion of said member of hard material comprises a cylindrical portion adjacent the enlarged portion of said post and of same cross-section as that of said enlarged portion.

* * * * *